Feb. 25, 1958  R. G. M. HEDLUND  2,824,928
CIRCUIT INTERRUPTER
Filed June 22, 1955
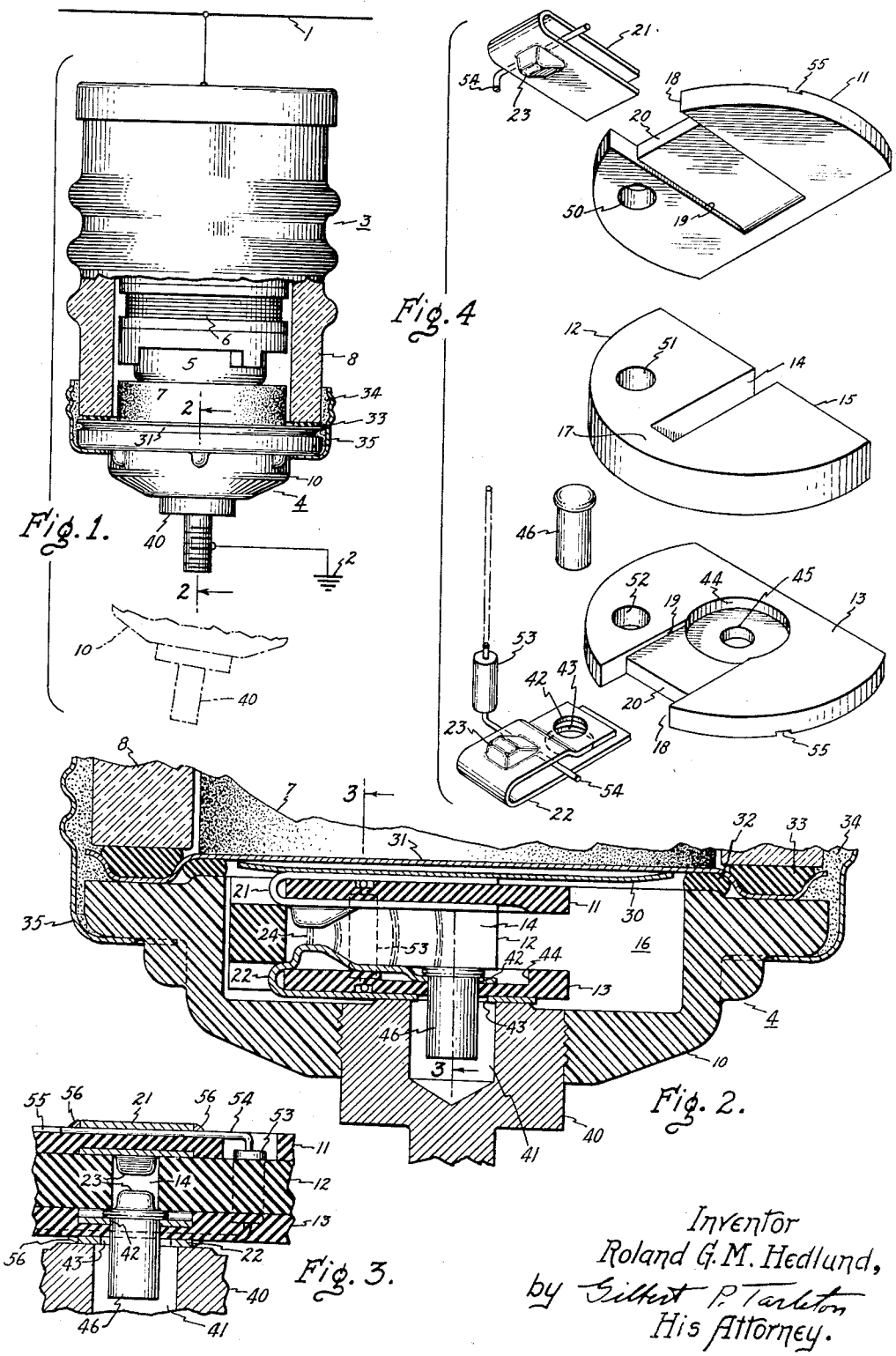
Inventor
Roland G. M. Hedlund,
by Gilbert P. Tarleton
His Attorney.

United States Patent Office 2,824,928
Patented Feb. 25, 1958

2,824,928
CIRCUIT INTERRUPTER

Roland G. M. Hedlund, Pittsfield, Mass., assignor to General Electric Company, a corporation of New York Application June 22, 1955, Serial No. 517,199
12 Claims. (Cl. 200—115)

This invention relates to circuit interrupters, and more particularly, to circuit interrupters of the inverse current-time responsive type for isolating or disconnecting faulty or damaged lightning arresters.

It is well-known in the art to cause an arc to ignite an explosive and thereby isolate or disconnect a lightning arrester from ground in the event the arrester fails to interrupt the power follow current after dissipation of the lightning surge to ground. Ideally, an isolator should function upon two or more half-cycles duration of sixty-cycle power follow current above a relatively low predetermined value. However, the isolator should also function upon a single half-cycle duration of sixty cycle power follow current above a relatively higher predetermined value lest a fuse or breaker back in the line operate before the isolator operates. If a line fuse or breaker operates before the isolator does then it is not known where in the line or in which of several lightning arresters on the line a fault resides.

As far as applicant is aware, prior art isolators do not substantially always reliably discriminate between the aforementioned predetermined power follow current values, and are known to sometimes even operate when there is no fault in the arrester.

Accordingly, it is an object of this invention to provide a lightning arrester isolator which will substantially always reliably discriminate between the aforementioned different predetermined power follow current values and fault and no fault conditions in the lightning arrester.

It is a further object of this invention to provide a lightning arrester isolator which will afford a great degree of control over the lightning arrester fault conditions under which it will operate.

It is a further object of this invention to provide a lightning arrester isolator which is low cost, uncomplicated, easily assembled, and readily adapted for use with conventional lightning arrester units.

In my invention I utilize the prior art principle of causing an electrical arc to ignite an explosive to affect disconnection or isolation of a faulty or damaged lightning arrester. However, the arc is not always in contact with the explosive, but is moved into contact therewith only when the lightning arrester is faulty or damaged. Otherwise the arc does not contact the explosive and thereby increase the risk of operation of the isolator when there is no fault in the lightning arrester. Only at lightning arrester fault conditions is the arc moved into contact with the explosive. Movement of the arc is accomplished by gaseous and magnetic means. At or above a relatively low predetermined sixty cycle current of two or more half cycles duration, the gaseous means is effective to move the arc into contact with the explosive, but not before then in terms of current magnitude or duration. At or above a relatively higher predetermined sixty cycle current of one half cycle duration the magnetic means is effective to move the arc into contact with the explosive, but not at currents less than said higher predetermined current. Thus, the isolator effectively discriminates between relatively low sixty cycle power follow currents which an undamaged lightning arrester will interrupt in one half-cycle duration, and relatively higher sixty cycle power follow currents of one half cycle duration which will either not be interrupted by the lightning arrester or will flow a fuse or trip a breaker before interruption by the lightning arrester.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing.

In the drawing, Fig. 1 is a partly broken away side elevation view of an enclosed distribution lightning arrester assembly having a preferred form of my invention incorporated therein. Fig. 2 is a partly broken away sectional view of my invention taken along the line 2—2 of Fig. 1. Fig. 3 is another partly broken away sectional view of my invention taken along the line 3—3 of Fig. 2. Fig. 4 is an exploded perspective view of some of the internal elements of my invention. Like reference numerals will be used throughout the various figures to indicate identical parts.

Referring now particularly to Fig. 1, illustrated therein is a distribution line 1 connected to ground 2 through a distribution lightning arrester unit or assembly 3 and a preferred form of my invention, lightning arrester isolator or disconnector 4. The arrester 3 constitutes no part of my invention, and is merely illustrative of several different types of lightning arrester units or assemblies with which my invention is usable. Generally speaking the arrester 3 comprises one or more alternately stacked gap units 5, magnetic coil units 6, and valve elements or non-linear resistors 7 enclosed within a generally cylindrical porcelain or other electrical insulating material housing 8. As is probably best illustrated in Fig. 2, my isolator 4 fits and closes the lower open end of housing 8 by suitable cement and gasket means.

The isolator 4 comprises a generally shallow hollow circular cup-shaped plastic or other electrical insulating material frangible member 10. Disposed within the hollow or cavity of member 10 are three generally semicircular superposed shallow flat slabs 11, 12, and 13 of electrical insulating material. The slab 12 has an elongated narrow rectangular blind arcing slot 14 formed therein. Slot 14 commences at the generally diametrical edge 15 of slab 12, and extends perpendicularly therefrom towards, but short of an opposite edge of slab 12. Slot 14 extends through opposite sides of slab 12, and at its right-hand end when viewing Figs. 2 and 4 is in open communication with a gas expansion chamber 16 defined between the interior surfaces of member 10 and the superposed slabs 11 to 13. The left-hand blind end of slot 14 is closed by an integral portion 17 of slab 12. The slab 12 is constructed from fiber or the like in a manner well-known to those skilled in the art whereby the interior surfaces of slot 14 will generate a gaseous medium when subjected to an electrical arc or the heat thereof.

Formed in the central portion of the semi-circular edges of slabs 11 and 13 are notches 18 which constitute continuations of grooves 19 formed in the bottom surface and upper surface of slabs 11 and 13 respectively to define reduced thickness portions 20. The parts 18 to 20 of slab 11 receive an elongated metallic U-shaped electrode member or clip 21, and the parts 18 to 20 of slab 13 receive a similar electrode member or clip 22. Clips 21 and 22 are similarly superposed with respect to slot 14 whereby the bridge portions thereof are disposed adjacent the closed end of slot 14 and the inner facing legs thereof are disposed in closing relationship with respect to the opposite open sides of slot 14 as illustrated in Fig. 3. The inner oppositely facing and spaced legs of clips 21 and 22 comprise electrical spark gap defining means poistioned within the enclosed arcing slot 14. The left-hand ends of the inner legs of clips 21 and 22 have a minimum spacing therebetween adjacent the closed end of slot 14 by virtue of bumps 23 whereby an electrical arc established between the clips 21 and 22 will be initially formed adjacent the left-hand closed end of slot 14.

A metallic contact plate 30 which makes eelctrical engagement with the outer leg of clip 21 is superposed with respect to slab 11. Another metallic contact plate 31 is disposed between plate 30 and the bottom surface of valve element 7 and makes electrical contact with both plate 30 and valve element 7. A gasket 32 is disposed between plate 31 and the annular rim of member 10, and a gasket 33 is disposed between plate 31 and the lower end edge of lightning arrester cylindrical housing 8. Cement 34 and an annular flanged metallic collar 35 together cooperate to securely connect the isolator 4 to the lower end of the lightning arrester unit 3.

An internally threaded through bore is formed in the bottom of member 10 and threaded into said internally threaded through bore of member 10 is a metallic grounding stud 40 which makes electrical contact with the outer or lower leg of clip 22. Formed in the upper end of stud 40 is a blind bore 41, and formed in the inner and outer legs respectively of the clip 22 are through apertures 42 and 43, respectively. Formed in the slab 13 is a through aperture 45 as well as a blind bore 44 in the upper surface thereof. The axis of the bores or apertures 41 to 45 are coincidental with each other and disposed in said aligned bores or apertures is a cartridge of explosive 46. The upper end of cartridge 46 protrudes into the arcing slot 14 adjacent the open end thereof and the aperture 43 has a large enough diameter whereby the outer leg of clip 22 will not make electrical contact with the cartridge 46. The right-hand end of the inner leg of clip 22 in which the aperture 42 is formed is slightly offset towards the outer leg of clip 22 and rests in the bore 44. The upper end or cap of cartridge 46 has a circumferential bead or shoulder formed thereon which engages the circumferential edge of aperture 42 to retain cartridge 46 in its illustrated assembled position.

Formed in the slabs 11 to 13 are aligned through apertures 50 to 52 respectively which are adapted to receive a resistor element 53. The opposite terminal leads 54 of resistor 53 extend along the outer sides of slabs 11 and 13 within grooves 55 formed therein and are securely and electrically fastened to the outer legs of clips 21 and 22 by solder 56 or the like. Paralleling of the spark gap formed by the clips 21 and 22 by resistor 53 is for the purpose of avoiding power voltage across the isolator 4 as long as the arrester is undamaged.

When lightning strikes the line 1 the surge will be dissipated to ground 2 by way of arrester 3 and isolator 4. That is, an electrical arc such as 24 will be established within the spark gap defining means 21 and 22 of the isolator 4 and current will flow from valve element 7 to contact plate 31, contact plate 30, clip 21, arc 24, clip 22, and stud 40 to ground 2. After the surge is dissipated the power follow current from line 1 will tend to maintain arc 24 until such time as the power follow current is interrupted by the arrester 3. The purpose of the isolator 4 is to move the arc 24 to the cartridge 46 in the event the arrester 3 is damaged or faulty, and to do this before line fuses or breakers have an opportunity to operate. If the arrester 3 is working properly it will interrupt 60 cycle power follow current at or about a predetermined relatively low value in one-half cycle. A single half-cycle current arc between electrodes 21 and 22 stays substantially in the position indicated by arc 24. However, at two or more half-cycles the arc 24 or heat thereof will generate enough gas from the interior fiber side walls of slot 14 to cause the gas pressure pent up in the left-hand closed end of slot 14 when viewing Fig. 2 to drive the arc 24 towards the right-hand end of slot 14 which opens into the expansion chamber 16. The cartridge 46 is disposed in the path of movement of arc 24 along the inner legs of the clips 21 and 22 so that at two or more cycles of power follow current the cartridge 46 will be exploded. Explosion of cartridge 46 causes fracture or rupture of the bottom of member 10 along the thinner portions thereof, dropping of the stud 40, and isolation of arrester 3 from ground 2.

It is not absolutely necessary to make the slab 12 from gas generating material since an arc in air itself will generate gas pressures. However, such gas generating material enables better control and more reliable movement of the arc 24 at a desired moment and current magnitude.

When the sixty cycle power follow current is at or above a predetermined relatively high value in one half cycle it may cause operation of line fuses or breakers. Therefore, for such high currents it is desirable that the isolator 4 operate before the line fuses or breakers. Movement of the arcs of such higher currents in one-half cycle is accomplished by having the arc 24 form one side of a magnetic current loop with the path of current travel through clips 21 and 22. The magnetic field of such current loop will react with the arc 24 in accordance with the left-hand motor rule to cause the arc 24 to move towards the right to ignite the cartridge 46 in one-half cycle. Such magnetic field will be ineffective to drive the arc to the cartridge 46 in one-half cycle with current of the heretofore mentioned relatively low values.

Control over the magnetic field for driving the arc 24 is provided in my invention by the electrode configuration. By giving the electrodes a U-shape the magnetic field is easily controlled. For instance, by varying the distance between the two legs of any single U-shaped clip the magnetic field can be controlled since the currents in said two legs oppose each other. A greater distance gives a stronger magnetic field, and decreasing distance decreases the magnetic field. Also, control of the magnetic field is provided by varying the width of the legs of the U-shaped clips since a wider width gives a weaker magnetic field, and decreasing the width increases the magnetic field.

It will be appreciated that the gaseous and magnetic actions heretofore described are not entirely independent of each other, but to a certain degree aid each other in moving the arc 24. For instance, in the case of higher arc currents a greater quantity of gas will be created within a shorter duration to aid the magnetic field in moving the arc in one-half cycle. Conversely, in the case of lower arc currents, the small magnetic field although incapable of itself to move the arc 24 to the cartridge 46 aids the gas pressures produced in two or more half cycles to move the arc 24 towards the right-hand end of the slot 14.

While there has been shown and described a particular embodiment of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. In a lightning arrester unit enclosed within a generally cylindrical electrical insulating material housing and providing an electrically conductive path therethrough to ground, means for isolating said unit from ground when said unit fails to interrupt power follow currents of predetermined magnitude and duration, said isolating means comprising a generally shallow hollow cup-shaped frangible electrical insulating material member adapted to be disposed in closing relationship with respect to one end of said cylindrical housing, a generally semi-circular electrical insulating slab positioned in the hollow of said cup-shaped member, said slab having an elongated slot formed therein commencing at the generally diametrical edge thereof and extending therefrom towards but short of an opposite edge thereof, said slot extending through the opposite sides of said slab, said slot having interior gas evolving surfaces, the commencing end of said slot being in open communication with an expansion chamber defined within said hollow between the interior surfaces thereof and said diametrical edge, the opposite end of said slot being closed by integral portions of said slab, a pair of electrically conductive metallic members positioned on opposite sides of said slab and closing the opposite open sides of said slot, said metallic members having a minimum spacing adjacent said closed end and extending therefrom towards said open end, a ground connecting terminal connected to said frangible member, and an explosive cartridge located in said open end for rupturing said frangible member to isolate said unit from ground.

2. A lightning arrester isolator having magnetic means for moving an electrical power follow current arc of predetermined magnitude and duration into contact with an explosive to interrupt said arc, said magnetic means comprising two side by side metallic U-shaped members which are spaced from each other and have one of their legs facing each other to define an elongated arcing gap therebetween, the bridge portions of said U-shaped members being positioned adjacent to each other and said one legs having a minimum spacing adjacent said bridge portions, a cartridge of explosive which is spaced from said bridge portions, and a portion of said cartridge being positioned between said one legs.

3. A lightning arrester isolator comprising three superposed electrical insulating material slabs, the central one of said slabs having a narrow slot formed therein which extends through the opposite sides thereof, the other two slabs having narrow U-shaped metallic clips embracing the opposite sides thereof, said clips being superposed and similarly aligned with respect to said slot and the inner facing legs of said clips having a minimum spacing adjacent the bridge portions thereof, and an explosive cartridge having a portion thereof disposed in said slot between said legs for interrupting an electrical arc between said inner forcing legs.

4. An isolator for isolating a lightning arrester unit from an electrical system when said unit fails to interrupt power follow currents of predetermined magnitude and duration, said isolator comprising a generally circular shallow hollow cup-shaped electrical insulating material frangible member having three generally semi-circular electrical insulating material superposed slabs positioned therein, the central one of said slabs having an elongated blind slot formed therein extending through the opposite sides and generally diametrical edge thereof, the outer ones of said slabs having elongated metallic U-shaped clips thereon, the end of said slot at said diametrical edge being open and the opposite end of said slot being closed, the bridge portions of said clips disposed adjacent said closed end and one of the legs of each of said clips extending therefrom along the opposite open sides of said slot towards said open end, said one legs having a minimum spacing adjacent said closed end, and a portion of an explosive cartridge disposed adjacent said open end for interrupting an electrical arc between said one legs.

5. A lightning arrester isolator comprising a slab of gas generating electrical insulating material having a narrow slot formed therein, said slot extending through opposite sides of said slab, being closed at one end thereof, and being in open communication at the other end thereof with an expansion chamber, a pair of U-shaped metallic members disposed on opposite sides of said slab whereby one leg of each of said U-shaped members closes one of the open sides of said slot, the bridge portions of said U-shaped members disposed adjacent said closed end and said U-shaped members extending therefrom towards said open end, said one legs of said U-shaped members which close said slot open sides having a minimum spacing adjacent said closed end, and an explosive positioned adjacent said open end for interrupting an electrical arc between said one legs.

6. A circuit interrupter comprising an arc chute, electrical spark gap defining means, and an explosive, said spark gap defining means and explosive being located in said arc chute, and said arc chute having gas evolving surfaces for moving an electrical arc established within said spark gap defining means into contact with said explosive for extinguishing said arc.

7. A lightning arrester isolator for disconnecting a faulty lightning arrester, said isolator comprising an arc chute, electrical spark gap defining means, and an explosive, said spark gap defining means and explosive being located in said arc chute, said arc chute being housed in a frangible member, and said arc chute having gas evolving surfaces for moving an electrical arc established within said spark gap defining means into contact with said explosive to fracture said member.

8. A circuit interrupter comprising a pair of electrodes which are positioned side by side and are spaced from each other, said electrodes being positioned between a pair of electrical insulating material gas generating surfaces which define an arc chute, said electrodes having a minimum spacing between one of their opposite portions to define an arc gap therebetween and said arc chute being closed in the vicinity of said arc gap whereby an electrical arc established across said arc gap will be moved along said electrodes in a direction away from said arc gap and said closed arc chute vicinity, and an explosive for interrupting said moved arc, said explosive being positioned between said electrodes and in the path of movement of said moved arc.

9. A circuit interrupter comprising a narrow elongated slot which is defined by gas generating electrical insulating material, one end of said slot being closed, and a pair of elongated electrodes which are positioned side by side and are spaced from each other, said electrodes having a minimum spacing between one of their corresponding opposite ends to define an arc gap therebetween, said minimum spaced electrode ends being positioned adjacent said closed slot end and said electrodes extending therefrom in a direction lengthwise of said slot whereby an electrical arc which is established across said arc gap and moved along said electrodes will extend in a direction which is generally parallel to two opposite interior side walls of said slot, and an explosive for interrupting said arc, said explosive being located between the other corresponding ends of said electrodes.

10. A lightning arrester isolator having magnetic means for moving an electrical power follow current arc of predetermined magnitude and duration into contact with an explosive to interrupt said arc, said magnetic means comprising a pair of generally elongated metallic members which are spaced from each other and face each other along their sides to define an arcing gap therebetween, said pair of members having a minimum spacing adjacent one of their ends, said one ends having continuations which are located outside said arcing gap and along said sides but in spaced relationship with respect to said sides, a cartridge of explosive, said cartridge being spaced from said one ends and having a portion thereof positioned adjacent the other ends of said members.

11. A lightning arrester isolator having gaseous means for moving an electrical power follow current arc of predetermined magnitude and duration into contact with an explosive to interrupt said arc, said gaseous means comprising an arc chute and electrical spark gap defining means said arc chute having surfaces which are positioned adjacent said electrical spark gap defining means, a cartridge of explosive, said cartridge being spaced from said spark gap defining means, and said arc chute surfaces being gas evolving for moving an electrical arc established within said spark gap defining means into contact with said cartridge.

12. A lightning arrester isolator having magnetic and gaseous means for moving an electrical power follow current arc of predetermined magnitude and duration into contact with an explosive to interrupt said arc, said magnetic means comprising a pair of generally elongated metallic members which are spaced from each other and face each other along their sides to define an arcing gap therebetween, said pair of members having a minimum spacing adjacent one of their ends, said one ends having continuations which are located outside said arcing gap and along said sides but in spaced relationship with respect to said sides, said gaseous means comprising an arc chute along said arcing gap, said arc chute having gas evolving surfaces, and a cartridge of explosive, said cartridge being spaced from said one ends and having a portion thereof positioned adjacent the other ends of said members.

References Cited in the file of this patent

UNITED STATES PATENTS

| | | |
|---|---|---|
| 999,780 | Harris | Aug. 8, 1911 |
| 1,265,121 | Schweitzer et al. | May 7, 1918 |
| 2,296,708 | Earle | Sept. 22, 1942 |
| 2,356,040 | Ellis et al. | Aug. 15, 1944 |
| 2,559,024 | McFarlin | July 3, 1951 |
| 2,608,599 | Kalb | Aug. 26, 1952 |
| 2,644,116 | Olsen | June 30, 1953 |